(12) United States Patent
Zhu

(10) Patent No.: US 12,487,115 B2
(45) Date of Patent: Dec. 2, 2025

(54) FOLDING WEIGHING SCALE

(71) Applicant: Min Zhu, Guangdong (CN)

(72) Inventor: Min Zhu, Guangdong (CN)

(73) Assignee: Shenzhen Medesigner Technology Co., LTD, Shenzhen (CN)

( * ) Notice: Subject to any disclaimer, the term of this patent is extended or adjusted under 35 U.S.C. 154(b) by 347 days.

(21) Appl. No.: 18/215,857

(22) Filed: Jun. 29, 2023

(65) Prior Publication Data
US 2023/0341256 A1    Oct. 26, 2023

(30) Foreign Application Priority Data

May 8, 2023   (CN) .......................... 202321101676.0

(51) Int. Cl.
*G01G 21/28* (2006.01)
*G01G 7/02* (2006.01)
*G01G 21/22* (2006.01)
*G01G 23/36* (2006.01)

(52) U.S. Cl.
CPC .............. *G01G 21/28* (2013.01); *G01G 7/02* (2013.01); *G01G 21/22* (2013.01); *G01G 23/36* (2013.01)

(58) Field of Classification Search
CPC ........ G01G 21/28; G01G 17/02; G01G 21/22; G01G 23/36; G01G 19/44
USPC ........................................................ 177/126
See application file for complete search history.

(56) References Cited

U.S. PATENT DOCUMENTS

| | | | |
|---|---|---|---|
| 6,441,323 B1 * | 8/2002 | Montagnino | G01G 21/283 177/127 |
| 6,700,080 B2 * | 3/2004 | Stephens | G01G 19/44 177/244 |
| 7,022,920 B2 * | 4/2006 | Hulburt | G01G 21/22 177/126 |
| 7,047,827 B1 * | 5/2006 | Mithal | G01G 19/44 73/862.581 |

FOREIGN PATENT DOCUMENTS

| | | | | |
|---|---|---|---|---|
| EP | 3133378 A1 * | 2/2017 | | G01G 19/44 |
| WO | WO-0184094 A1 * | 11/2001 | | G01G 21/22 |

\* cited by examiner

*Primary Examiner* — Jacques M Saint Surin

(57) ABSTRACT

A foldable weighing scale includes first and second steel frames, connecting rods fastened at bottoms of the first and second steel frames, first pressure sensors fastened at ends of the connecting rods away from the first frame, second pressure sensors fastened at ends of the connecting rods away from the second frame, a display fastened on the first steel frame, and a power supply box fastened on the first steel frame. The display and the first and second pressure sensors are battery powered. There is further provided a switch button connected to a power supply box, and a rotating connection component between the first steel frame and second steel frame. The rotating connection component includes a first connector for rotating in the first steel frame and a second connector fastened on the second steel frame. Part between the first connector and second connector can rotate and is detachable.

7 Claims, 4 Drawing Sheets

FOLDING WEIGHING SCALE

BACKGROUND OF THE INVENTION

1. Field of the Invention

The invention relates to weighing scales and more particularly to a folding weighing scale.

2. Description of Related Art

Electronic scales are a type of weighing apparatus used for measuring object mass based on Hooke's law or the lever balance principle. An electronic scale mainly comprises a load-bearing system (such as a scale pan, a scale body), a force transfer system (such as a lever force transfer system, a sensor) and an indication system (such as a dial, an electronic display instrument). The workflow of an electronic scale is that when an object is placed on the scale, a pressure will be applied to the sensors, which deform, resulting in changed impedance and at the same time, changed excitation voltage, outputting a changed analog signal. The signal can be output by an amplification circuit to an analog-to-digital sensor and then converted into a digital signal for easy processing and output to the CPU for operation and control. The CPU can output this result to the display based on the keyboard commands and program until it is displayed.

Considering the conventional technologies mentioned above, the inventor believes that traditional household electronic scales have an overall carrying area bigger than the size of normal people's feet for the sake of convenient and direct measurement, resulting in a bigger overall unfolded area of the electronic scale and making it more subject to damage due to compression and collision when carried. In addition, generally, folding scales made based on existing technologies can only be folded in half, however, they are thicker after folding and also subject to be compressed, therefore, a further improvement is needed.

SUMMARY OF THE INVENTION

The invention aims to provide a folding weight scale, which are user-friendly, comprises two steel frames and load-bearing plates and can be folded, detached and stored separately when not in use.

In order to achieve the above objectives, the invention provides a technical solution as follows: A folding weight scale, including a first steel frame, a second steel frame, connecting rods fixed at the bottoms of the first and second steel frames, first pressure sensors fixed at the ends of the connecting rods away from the first frame, second pressure sensors fixed at the ends of the connecting rods away from the second frame, a display fixed by screws on the first steel frame and a power supply box fixed by screws on the first steel frame. The display, first pressure sensors and second pressure sensors are powered by the batteries inside the power supply box. A switch button is connected to one side of the power supply box. The switch button is fixed by screws on the first steel frame. A rotating connection component is used between the first steel frame and the second steel frame. The rotating connection component includes a first connector that is locked for rotating inside the first steel frame and a second connector that is fixed on the second steel frame. The part between the first connector and second connector can rotate and is detachable; Furthermore, the first connector has a groove at the end away from the first steel frame, and a through-groove is made beside the groove. The angle of the through-groove is 180°, and a slider is installed in the through-groove through sliding connection. The slider is fixed with a connecting plate at the end away from the through-groove, and the connecting plate is fixed with a pin at the end away from the slider. The second connector is fixed with fixing rods on both sides. Two fixing rods are used wherein one fixing rod has a waist-groove, and the other fixing rod has a through-slot.

Furthermore, the pin has a V-groove at the end away from the connecting plate, and fixing blocks fixed on the pin are installed on both sides of the V-groove.

According to the above solution, the size of the through-slot is slightly bigger than that of the pin. However, the two fixing blocks cannot pass through the through-slot when being completely free, which ensures that the two fixing rods can rotate along the pin in a movable manner. When sliding along the through-slot, the connecting plate and pin can be driven to rotate. Therefore, during rotation, the pin can be inserted into the waist-groove and through-slot, thereby achieving the installation of the first connector and second connector. After installation, the first and second steel frames can rotate freely.

Furthermore, the interior of the groove is fixed with an aluminum rod, and the exterior of the aluminum rod is wound with a conductive coil electrically connecting to the power supply box.

An aluminum-iron-boron magnet block is embedded in the middle of the second connector.

According to the above solution, after the first and second steel frames are connected and installed through the rotating connection component, the first and second steel frames should be prevented from rotating freely due to the pressure during weighing. A magnetic field will be generated by energizing the above said conductive coil which then will be adsorbed by and fixed with the aluminum-iron-boron magnet block to ensure the overall stability of the weight scale during weighing. At the same time, the conductive coil is powered by the power supply box, and the switch button is used for controlling the current conduction, achieving a one-click control for easy operation.

The size of the above aluminum-iron-boron magnet block can be adjusted according to the weight limit of the overall weight scale, and the number of turns of the conductive coil can be adjusted to change the magnetic field strength. The absorption is always stable within the weight limit of the weight scale, making the first and second steel frames stably connected during weighing. The used aluminum rod can help to increase the magnetic permeability to a certain extent, and at the same time, when the conductive coil is not energized, the adsorption between the aluminum rod and aluminum-iron-boron magnet block can be avoided.

Furthermore, both the first and second steel frames are installed with a load-bearing plate.

Furthermore, the second pressure sensors are connected to a first conductor. The first conductor is placed inside the second steel frame and extends along the second connector. The extended end is fixed with a terminal, and the first steel frame is also provided with a second conductor. The second conductor extends along the groove inside the first connector, and the extended end is locked with the terminal. The second conductor is connected to the display.

According to the above solution, the two second pressure sensors are convenient for wiring and can be easily detached from the first and second steel frames for carrying separately.

The invention has the following advantages and benefits in comparison with the conventional art: the first and second connectors can be connected to the first and second steel frames, respectively. When folding, they can rotate along the pin to fold the entire weight scale. If the folded weight scale is too thick during carrying, it can also be detached. The pin can be removed through rotation for easy use.

A magnetic field can be generated by energizing the conductive coil which then will be adsorbed by and fixed with the aluminum-iron-boron magnet block to ensure the overall stability of the weight scale during weighing. At the same time, the conductive coil can be powered by the power supply box, and the switch button can be used for controlling the current conduction, achieving a one-click control for easy operation.

The first and second conductors are connected in a plug-in manner, further facilitating the detachment of the second steel frame and second pressure sensors.

The above and other objects, features and advantages of the invention will become apparent from the following detailed description taken with the accompanying drawings.

DETAILED DESCRIPTION OF THE INVENTION

Figure 1:
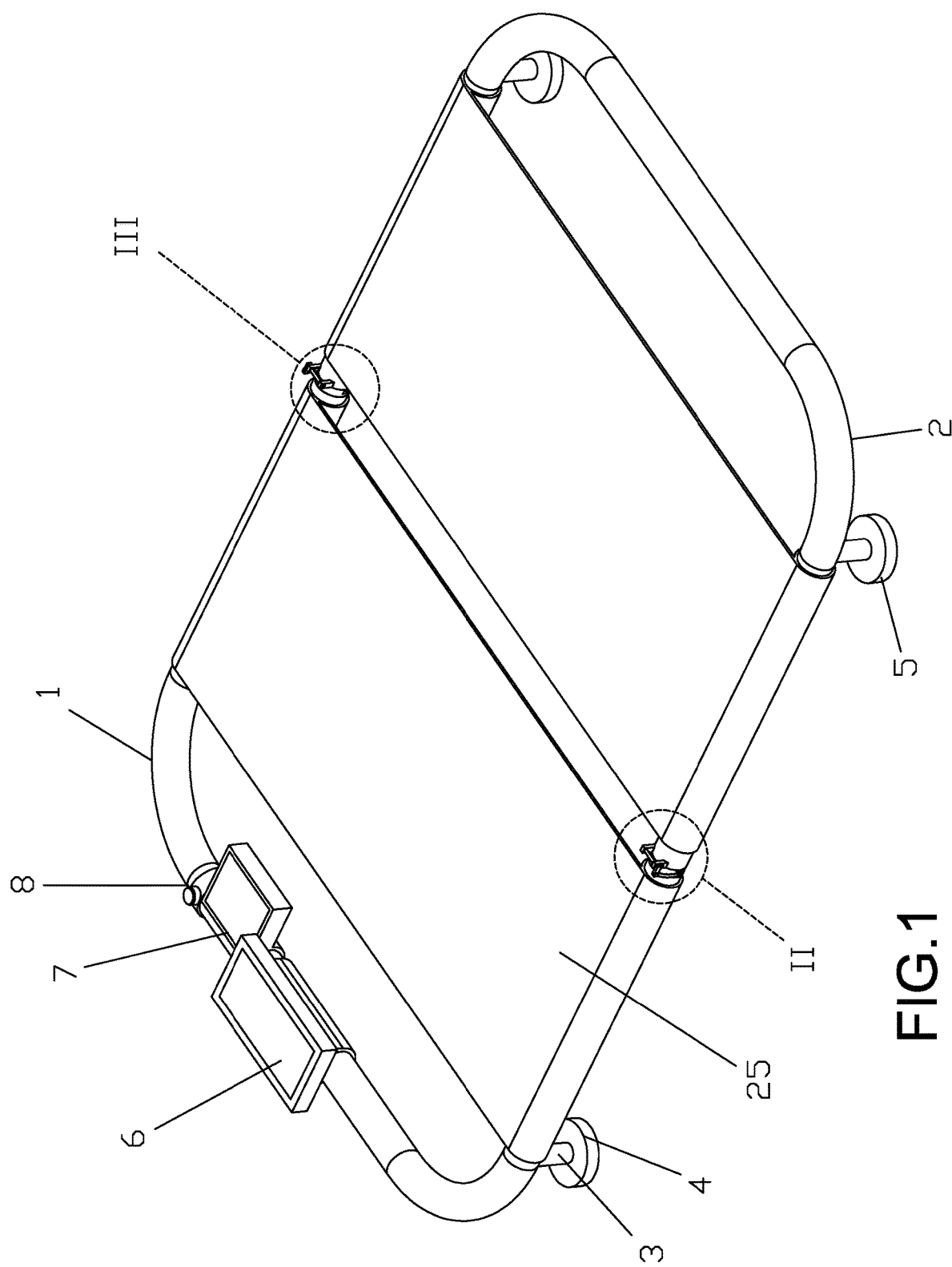
FIG. 1 is a perspective view of a folding weighing scale according to the invention.
Figure 3:
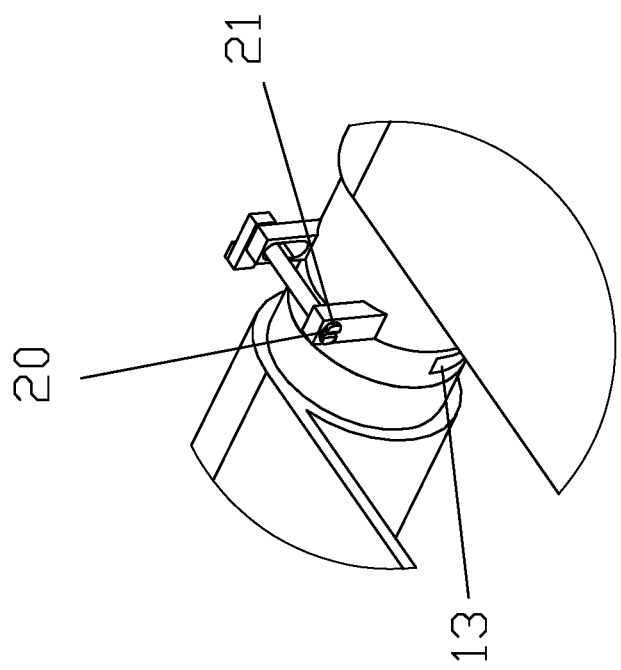
FIG. 3 is a detailed view of the area in circle III in FIG. 1.
Figure 2:
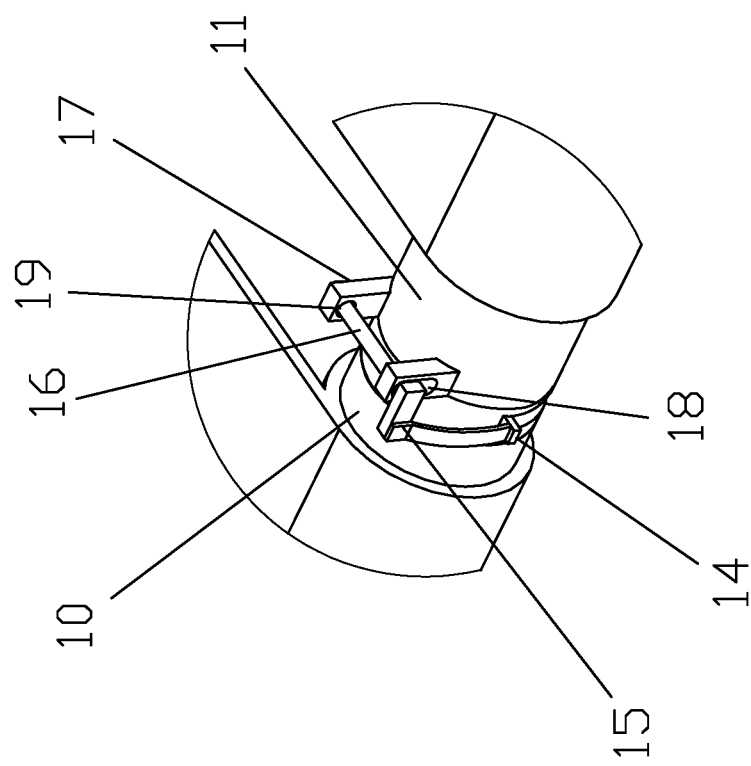
FIG. 2 is a detailed view of the area in circle II in FIG. 1.
Figure 4:
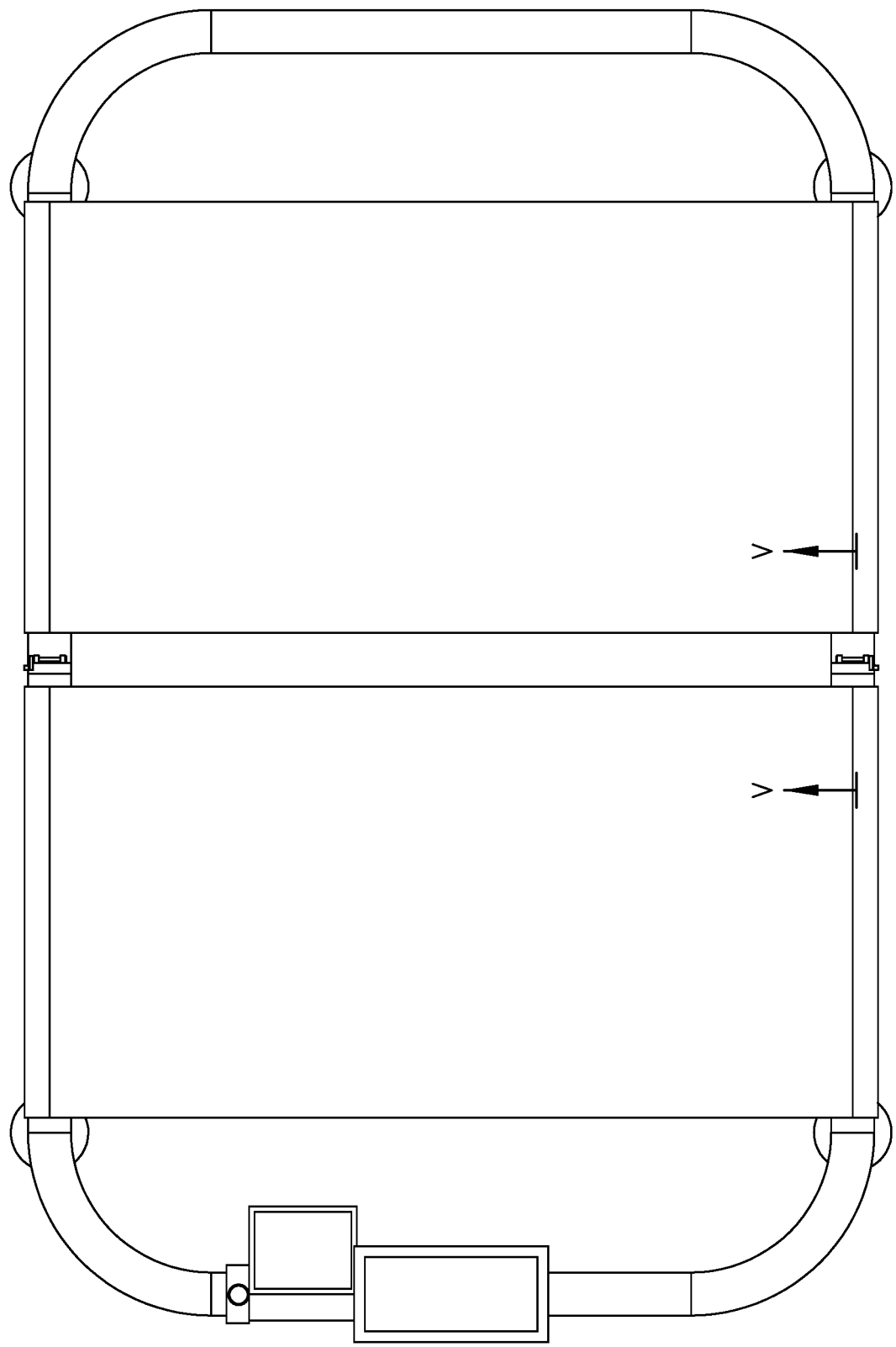
FIG. 4 is a top plan view of the folding weighing scale in FIG. 1.
Figure 5:
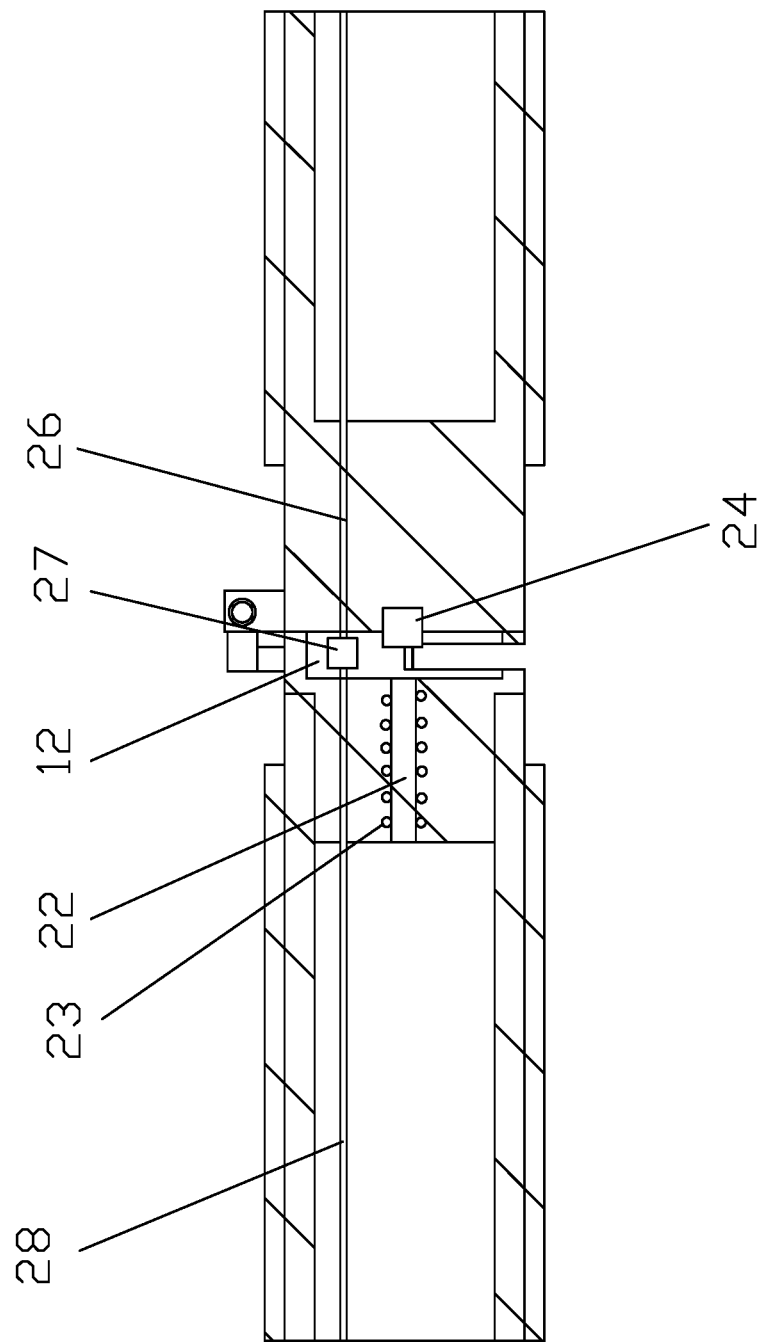
FIG. 5 is a sectional view taken along line V-V in FIG. 4.

Referring to FIGS. 1 to 5, a folding weighing scale of the invention is described in detail below. In the invention, the first and second steel frames are all made of magnesium-aluminum alloy. The insides of the first and second steel frames are hollow for arranging the conductors of the first pressure sensors, second pressure sensors, power supply box and display. The model of the first and second pressure sensors is CZL913AB. The power supply box requires two batteries inside, and the load-bearing plate can be made of materials such as canvas, special glass and metal panel. The batteries, switch button and display form an overall control circuit through an integrated circuit board. The integrated circuit board can be set inside the first steel frame, and the switch button can be arranged for the sake of easy operation.

The principle of using the display, first pressure sensors and second pressure sensors for weighing is well known and a detailed description is omitted herein for the sake of brevity.

The folding weighing scale comprises a first steel frame 1, a second steel frame 2, connecting rods 3 fixed at the bottoms of the first steel frame 1 and second steel frame 2, first pressure sensors 4 fixed at the ends of the connecting rods 3 away from the first frame 1, second pressure sensors 5 fixed at the ends of the connecting rods 3 away from the second frame 2, a display 6 fixed by screws on the first steel frame 1 and a power supply box 7 fixed by screws on the first steel frame 1. The display 6, first pressure sensors 4 and second pressure sensors 5 are powered by the batteries inside the power supply box 7. A switch button 8 is connected to one side of the power supply box 7. The switch button 8 is fixed by screws on the first steel frame 1. A rotating connection component 9 is used between the first steel frame 1 and second steel frame 2. The rotating connection component 9 includes a first connector 10 that is locked for rotating inside the first steel frame 1 and a second connector 11 that is fixed on the second steel frame 2. The part between the first connector 10 and second connector 11 can rotate and is detachable. The switch button 8 can be used for turning on the power supply box 7 to supply power.

When in use, connect the first steel frame 1 with the second steel frame 2 through the rotating connection component 9 set in the middle. Insert the first connector 10 into the first steel frame 1, at this time, make a butt joint between the first connector 10 and second connector 11, and rotate the first connector 10 for the sake of easy insertion. Move the slider 14 to make the slider 14 slides along the through-groove 13. With the sliding of the slider 14, the connecting plate 15 and pin 16 will be driven by the slider 14 to move. Insert the pin 16 along the waist-groove 18 of the fixing rod 17 on the second connector 11, and gradually extend it into the through-slot 19 of the other fixing rod 17. At this time, hold the fixing blocks 21 to make the pin 16 pass through the through-slot 19 smoothly. After passing through it, due to the V-groove 20 at the front end of the pin 16, when loosening the two fixing blocks 21, the two fixed blocks 21 can automatically expand, preventing the pin 16 from sliding out of the through-slot 19. At this time, the assembly is completed.

The second pressure sensors 5 are connected to a first conductor 26. The first conductor 26 is placed inside the second steel frame 2 and extends along the second connector 11. The extended end is fixed with a terminal 27, and the first steel frame 1 is also provided with a second conductor 28. The second conductor 28 extends along the groove 12 inside the first connector 10, and the extended end is locked with the terminal 27. The second conductor 28 is connected to the display 6. While connecting the first connector 10 and second connector 11, the first conductor 26 can be connected to the second conductor 28, and the used terminal 27 is similar to the network cable connector and can be used for locking connection.

At this time, by pressing down the switch button 8, the display 6, first pressure sensors 4 and second pressure sensors 5 can be simultaneously turned on. Energize the conductive coil 23. The aluminum rod 22 will be magnetic under the energized conductive coil 23 and adsorbed to the aluminum-iron-boron magnet block 24 in the middle of the second connector 11. Fix the first steel frame 1 and second steel frame 2 completely. Then, place the object to be weighed directly on the load-bearing plate 25. The obtained pressure value will be transmitted to the display 6 through the two first pressure sensors 4 and two second pressure sensors 5 to complete the weighing.

When folding, turn off the power supply box 7 through the switch button 8. At this time, the conductive coil does not generate a magnetic field since being no longer energized. The second connector 11 and the first connector 10 are no longer fixed, so they can rotate along the pin 16 to fold the entire weighing scale; If the folded weighing scale is too thick during carrying, it can also be detached. While holding the two fixed blocks 21, move the slider 14 to make the pin 16 gradually move out of the through-slot 19 and waist-groove 18. At this time, the first steel frame 1 and second steel frame 2 are disconnected and can be carried separately, providing users with multiple choices.

While the invention has been described in terms of preferred embodiments, those skilled in the art will recognize that the invention can be practiced with modifications within the spirit and scope of the appended claims.

What is claimed is:

1. A folding weighing scale, comprising:
   a first steel frame;
   a second steel frame;
   a plurality of connecting rods fixed at bottoms of the first steel frame and second steel frame;
   a plurality of first pressure sensors fixed at ends of the connecting rods away from the first frame;
   a plurality of second pressure sensors fixed at ends of the connecting rods away from the second frame;
   a display fixed by screws on the first steel frame;
   a power supply box fixed by screws on the first steel frame wherein the display, the first pressure sensors, and the second pressure sensors are powered by batteries inside the power supply box;
   a switch button connected to one side of the power supply box wherein the switch button is fixed by screws on the first steel frame; and
   a rotating connection component disposed between the first steel frame and second steel frame;
   wherein the rotating connection component includes a first connector that is locked for rotating inside the first steel frame, and a second connector that is fixed on the second steel frame; and
   wherein a part between the first connector and the second connector is configured to rotate and is detachable.

2. The folding weighing scale of claim 1, wherein the first connector includes a groove at an end away from the first steel frame, a through-groove is made beside the groove; an angle of the through-groove is 180°, and a slider is installed in the through-groove through sliding connection and fixed with a connecting plate at an end away from the through-groove; wherein the connecting plate is fixed with a pin at an end away from the slider; wherein the second connector is fixed with two fixing rods on both sides; and wherein one fixing rod has a waist-groove and the other fixing rod has a through-slot.

3. The folding weighing scale of claim 2, wherein the pin has a V-groove at an end away from the connecting plate, and wherein a plurality of fixing blocks fixed on the pin are installed on both sides of the V-groove.

4. The folding weighing scale of claim 2, wherein the groove is internally fixed with an aluminum rod, wherein the aluminum rod is externally wound with a conductive coil, and wherein the conductive coil is electrically connected to the power supply box.

5. The folding weighing scale of claim 2, wherein an aluminum-iron-boron magnet block is embedded in a middle of the second connector.

6. The folding weighing scale of claim 1, wherein both the first steel frame and the second steel frame are installed with a load-bearing plate.

7. The folding weighing scale of claim 2, wherein the second pressure sensors are connected to a first conductor; wherein the first conductor is placed inside the second steel frame and extends along the second connector, an extended end of the first conductor is fixed with a terminal; wherein the first steel frame is also provided with a second conductor, the second conductor extends along the groove inside the first connector, and an extended end of the second conductor is locked with the terminal; and wherein the second conductor is connected to the display.

* * * * *